United States Patent
Wagner et al.

[15] 3,665,983
[45] May 30, 1972

[54] SABRE SAWS WITH ANGULARLY ADJUSTABLE SWIVEL SAW BARS

[72] Inventors: Robert W. Wagner, Easley, S.C.; John McLaughlin, Raleigh, N.C.

[73] Assignee: The Singer Company, New York, N.Y.

[22] Filed: Dec. 15, 1970

[21] Appl. No.: 98,251

[52] U.S. Cl. .............................................. 143/68 F, 143/74
[51] Int. Cl. ........................................................ B27b 19/08
[58] Field of Search ............... 143/68, 68 E, 68 F, 74, 70, 143/71

[56] References Cited

UNITED STATES PATENTS

| | | | |
|---|---|---|---|
| 3,494,391 | 10/1970 | Mango | 143/68 F |
| 3,494,390 | 10/1970 | Dudek | 143/68 F |
| 3,547,166 | 12/1970 | Dudek | 143/74 X |

*Primary Examiner*—Donald R. Schran
*Attorney*—Marshall J. Breen, Chester A. Williams, Jr. and Harold Weinstein

[57] ABSTRACT

A sabre saw is provided with means for driving the saw bar in a linear reciprocatory motion from a rotary electric motor, while at the same time, permitting the saw bar to be manually rotated or selectively locked in position about its own axis to set the cutting edge of the saw blade in different angularly oblique positions relative to the line of movement of the tool. A control knob is fixedly connected to a journal bushing held captive in the housing, but free to rotate therein. The journal bushing has a central "D" aperture through which extends the slabbed upper end of the saw bar. The saw bar slides up and down within the journal bushing and its angular position is controlled by the angular position of the journal bushing which is caused to be rotated by the control knob. A control bar is operatively secured to the control knob to selectively cam a control arm in a locked or unlocked position. The control arm carries a spring-biased locking pin which in locked position will engage one of a plurality of holes set in the housing at predetermined angular positions corresponding to the desired angular position of the cutting edge of saw blade. With the control bar in the unlocked position, the control knob can be manually manipulated so as to suitably position the cutting edge of the saw blade, as in scroll cutting.

4 Claims, 9 Drawing Figures

Patented May 30, 1972

WITNESS:
Marvin Rothberg

INVENTORS
Robert W. Wagner
John McLaughlin
BY
Marshall J. Breen
ATTORNEY

Patented May 30, 1972

INVENTORS
Robert W. Wagner
John McLaughlin

BY Marshall J. Breen
ATTORNEY

WITNESS:
Marvin Rotenberg 3,665,983

1

SABRE SAWS WITH ANGULARLY ADJUSTABLE SWIVEL SAW BARS

BACKGROUND OF THE INVENTION

The Bechtold U.S. Pat. No. 2,547,922, was the earliest patent to show rotation of a saw bar of a sabre saw about its own axis. However, the prior Bechtold device required a frictional locking means to hold the saw bar in position and a saw bar which had a square bore in one end to permit reciprocatory motion thereof. More recently, U.S. Pat. Nos. 3,494,390 and 3,494,391, each entitled "Sabre Saw with 360° Swivel Saw Bar" have used a pin locking means and a key locking means, respectively, in place of the frictional locking means. Whether the pin or key were used, pre-alignment was necessary in order to have the pin or key inserted into a locking slot to hold the saw bar in the selected angular position.

SUMMARY OF THE INVENTION

It is therefore an object of the present invention to provide an automatically effective operative means for selectively and manually controlling the angular position of the saw bar of a sabre saw about its own axis at all times during the cutting operation, without adding substantially to the production costs of the tool; which overcomes the prior art disadvantages; which uses a cam actuated spring-biased locking means, positionable between a locked and an unlocked position.

It is a further object of this invention to accomplish the above objective by providing a structure which does not require extensive modification of existing sabre saws and is easy to operate, reliable and economical to produce; which uses a control knob, rotatably connected to the housing and coacting therewith to selectively lock the saw bar in angularly adjusted position or rotate the same for scroll cutting.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figures 1, 2, 9:
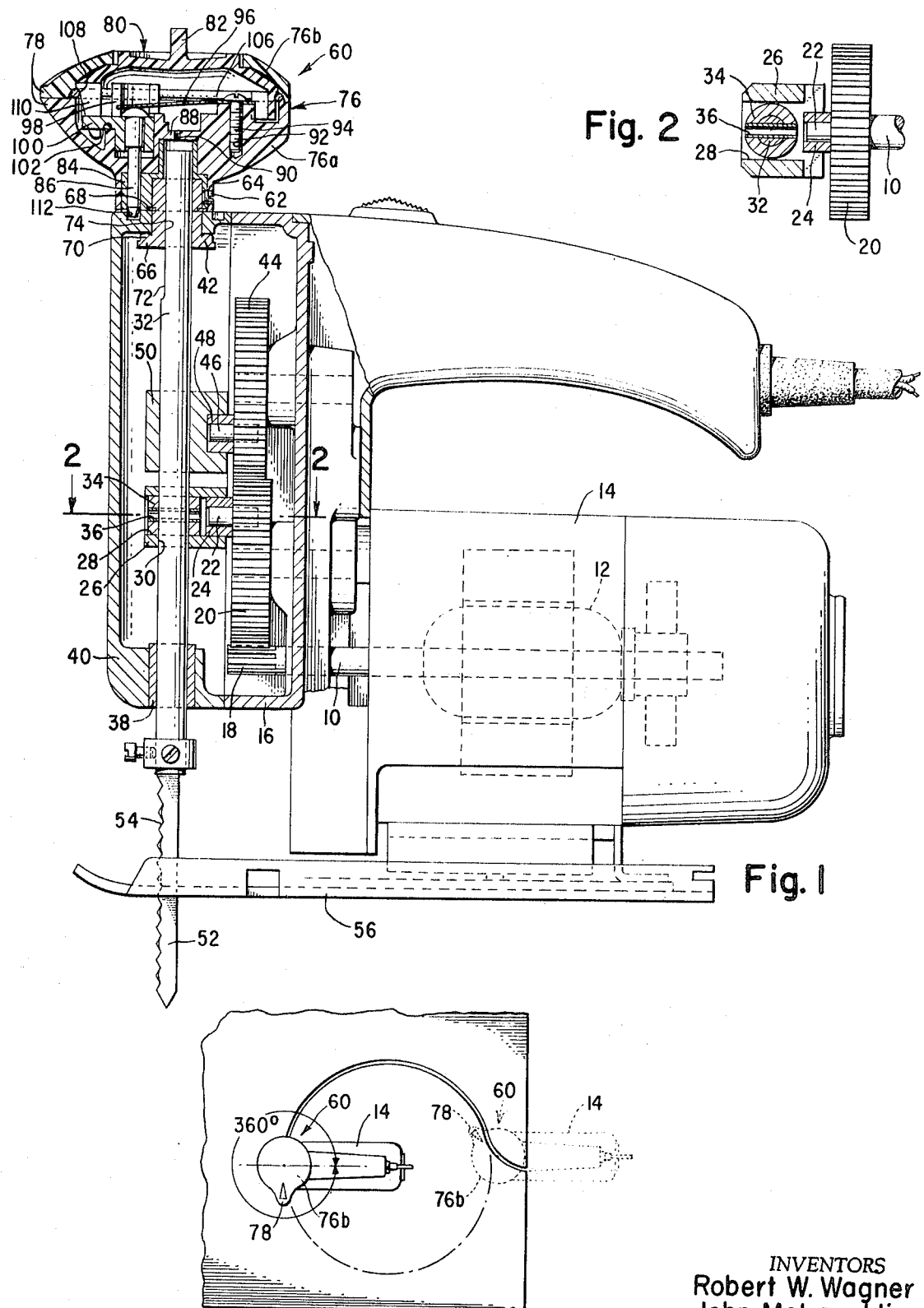
FIG. 1 is a longitudinal elevational view, partly in section, of a sabre saw illustrating an embodiment of the present invention.
FIG. 2 is a sectional view, taken along line 2—2 of FIG. 1.
FIG. 9 is a view illustrating the use of the sabre saw of this invention in cutting a circular disc from a work piece.

Referring now to FIG. 1 of the illustrated embodiment of the invention, a shaft of a driving electric motor 12 mounted in the housing 14 extends into the gear housing 16 and is formed with a splined portion 18 which meshes with and drives a gear 20 journaled in the gear housing 16. The gear 20 carries an eccentric pin 22 surmounted by a roller 24 which engages the slide portion of a crosshead 26. The crosshead 26 has a central transverse opening 28 in communication with the slide portion. A pair of aligned holes 30 are formed in the top and bottom of the crosshead 26 perpendicular to the transverse opening 28 of a circular diameter just slightly larger than the cross-sectional diameter of a saw bar 32 which extends therethrough.

The saw bar is free to turn about its axis within the holes 30 of the crosshead 26, but is held axially captive by an annular collar 34 disposed in the opening 28 and affixed to the saw bar 32 by a split pin 36 as illustrated in FIGS. 1 and 2. The saw bar 32 is journaled for linear movement in a sleeve bearing 38 secured in the bottom portion of a gear housing cover 40, and a journal bushing 42 secured in the top portion of the gear housing cover 40, as set more fully hereinafter.

A gear 44 journaled in the gear housing 16 meshes with gear 20, and by means of a eccentric pin 46 and roller 48, drives an upper balancing crosshead 50 which is free to turn and slide on the saw bar 32.

Upon operation of the sabre saw, the motor shaft 10 will drive the gear 20 which, through pin 22 and roller 24 working in crosshead 26, transmits linear axial reciprocatory motion to the saw bar 32 and drives an affixed saw blade 52 having a cutting edge 54 in a linear reciprocatory path substantially normal to the plane of a work-contacting shoe 56.

In the conventional sabre saw, there is no structure for selectively determining the angular position of the saw bar about its own axis, and thus, no means, other than for straight cutting, for presenting the cutting edge of the saw blade in a predetermined angular position with respect to the work.

In the illustrated embodiment of the invention, an improved means in the form of a control knob generally designated as 60, is provided for selectively and manually controlling the angular position of the saw bar 32 while it is reciprocating to provide the cutting strokes for the saw blade 52. The control knob 60 is affixed to the journal bushing 42 by a pair of set screws 62, carried in tapped holes 64 formed at 90° to each other, and of which only the rear screw 62 and tapped hole 64 is shown in FIG. 1.

Figures 3, 4, 5, 6, 7, 8:
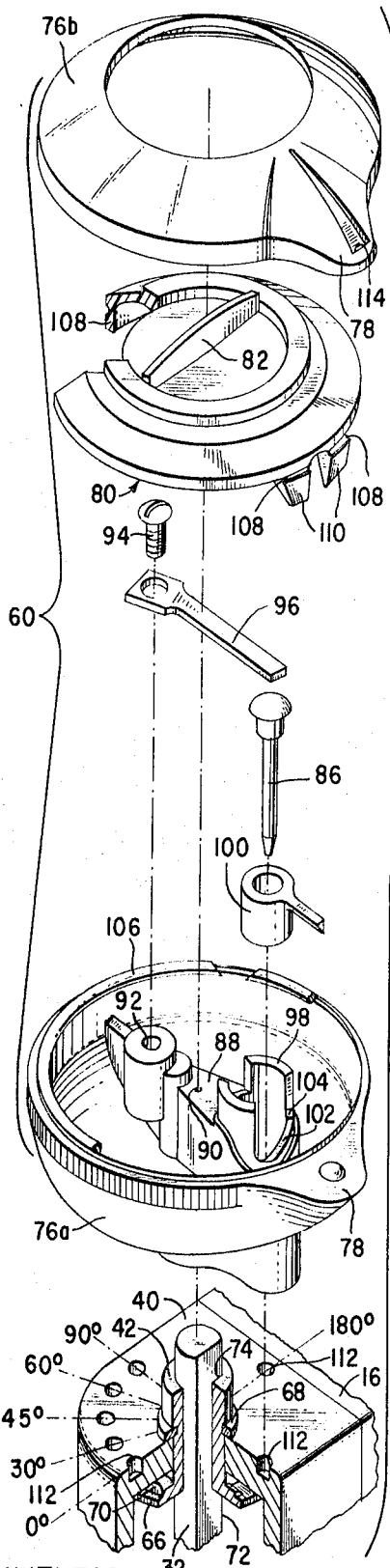
FIG. 3 is an exploded perspective view, partly in section, illustrating the structural details of the control knob assembly.
FIG. 4 is an elevational view, partly broken away, of the control knob in a locked position within the housing.
FIG. 5 is an elevational view, partly broken away, of the control knob in unlocked position with respect to the housing.
FIG. 6 is an enlarged view taken along line 6—6 of FIG. 4.
FIG. 7 is a greatly enlarged view, partly in section and broken away, of the control knob showing the control arm and locking pin in locked position within the housing.
FIG. 8 is a greatly enlarged fragmentary view of the control knob partly in section, showing the control arm and locking pin cammed to the unlocked position to free the control knob to rotate relative the housing.

The journal bushing 42 is held captive in the upper portion of the gear housing cover 40 by its annular flange 66 preventing upper movement thereof, and a snap ring 68 affixed therein, to prevent lower movement thereof. The journal bushing 42 has an axis coincident with the axis of the saw bar 32 and is free to rotate thereabout. To prevent binding and to lessen frictional contact of the flange 66 upon turning of the journal bushing 42, a plurality of semicircular raised projections 70 are formed on the upper surface of the flange 66 to contact the lower surface of the gear housing cover 40 whereby a plurality of point contacts greatly enhance the rotary motion thereof. In the straight cutting position as illustrated in FIG. 1, the slabbed top portion 72 will be facing forwardly or in the direction of cutting. The slabbed top portion 72 of the saw bar 32 is "D" shaped in cross-sectional area, as best shown in FIG. 3. The journal bushing 42 has a central aperture 74 of corresponding "D" shape to that of the slabbed section 72 whereby the flats between the slabbed section 72 and the aperture 74 will mate closely so that external rotation of the journal bushing 42 will cause like rotation of the saw bar 32, while permitting the reciprocal motion of the saw bar 32.

The control knob 60 is a separate assembly which can be assembled remote from the tool for subsequent affixing to the journal bushing 42. The control knob 60 has a two-piece housing 76 made up of a lower housing 76a and an upper housing 76b, which as a last step in the assembly of the control knob 60, is permanently bonded to the lower housing 76a. Each of the housing halves have mating snouts which combine to act as a pointer 78 to correspond to and indicate the direction of cutting. The upper housing 76b has a central opening through which a control bar 80 extends with its raised finger bar 82 for operator actuation, as more fully explained hereinafter. The lower housing 76a as illustrated in FIGS. 1, 7 and 8, has a metal insert 84 which increases the strength thereof in the area of greatest stress at the bottom of the housing adjacent the connection to the journal bushing 42, to which it is connected. The front portion of the insert 84 extends radially outwardly within the lower housing 76a to serve as a lower journal for a metal locking pin 86 as shown in FIGS. 1, 7 and 8. The lower housing 76a has an integrally molded platform 88 which extends diametrically in line with the pointer 78 in an otherwise hollow interior thereof. The midportion of the platform 88 has an aperture 90 in line with the axis of the saw bar as illustrated in FIGS. 1 and 3, and an enlarged circular rear portion having a tapped hole 92 to which is connected a screw 94 to which is affixed a leaf spring 96, extending in the direction of the pointer 78. The front edge of the spring engages the head of the metal locking pin 86 and biases the same downwardly. The spring 96 extends into the rear slot of a cylindrical portion 98 having a counterbore in the upper section thereof to carry a control arm member 100 through which the locking pin 86 passes. The portion 98 has an enlarged open front, the surface of which, forms a cam 102 which as viewed in FIGS. 3, 7 and 8, has the lowest edge on the left side thereof, and rises rightwardly to terminate in a ledge 104. The arm portion of the control arm 100 extends outwardly of the cam 102 for purposes more fully described hereinafter.

A split circular wire 106 seats along the inner periphery of the upper edge of the lower housing 76 as is best seen in FIGS. 1 and 3, and has seated thereon a front and back skirt portion 108 of the control bar 80. The front portion of the skirt 108 has downwardly extending bifurcated arms 110 which will extend on either side of the outwardly projecting control arm 100 to trap the same therebetween. Subsequent to the positioning the control bar 80, the upper housing 76b may be bonded to the lower housing 76a, so as to complete the assembly of the control knob 60 as is illustrated in FIGS. 1, 4 and 5. The upper surface of the gear housing member 40 is cast substantially flat with a plurality of apertures 112 formed at the indicated angular positions shown in FIG. 3 or any other desired angles along a hypothetical circular line of equal radius to that of the position of the locking pin 86 in the control knob 60 with the axis of the saw bar serving as the center point. The points are shown as being 0° which is equal to straight cutting and then set off at convenient angles such as 30°, 45°, 60°, 90° and 180°.

Upon affixing the control knob 60 to the journal bushing 42, the locking pin 86 is aligned with the apertures 112 in that upon rotating the control knob 60, the locking pin 86 will pass over each and every one of the apertures 112. Manipulation of the finger bar 82 of the control bar 80 will force the control arm 100, which is spring-biased by leaf spring 96 against the cam 102, into a locked position shown in FIGS. 1, 4, 6 and 7, or an unlocked position shown in FIGS. 5 and 8, and shown in phantom in FIG. 6.

When scroll cutting is desired, the control bar 80 will be placed in the unlocked position by turning the finger bar 82 counterclockwise to cause the bifurcated arms 110 to force the control arm 100 upwardly along the cam 102 to rest upon the ledge 104, thus forcing the control arm upwardly along with the captive locking pin 86 to raise the same out of the housing aperture 112 and thereby free the control knob 60 to rotate the journal bushing 42 and companion saw bar 32 therewith.

When straight cutting or a desired angular cut is desired, the control knob 60 will be rotated to approximately align the pointer 78 corresponding to the desired angle of cut. The finger bar 82 will be rotated clockwise to force the control arm 100 off of the raised ledge 104 and downwardly along the cam 102 to a lowered position in which the release spring 96 will bias the locking pin 86 downwardly into the housing aperture 112 to thus lock the control knob and connected saw bar 32 and saw blade 52 in the desired annular position. If the approximate adjustment of the control knob 60 has not perfectly aligned the locking pin 86 in superposition to the housing aperture 112, the operator need only turn the control knob 60 in the necessary direction to perfect the alignment, at which time, the spring-biased locking pin will automatically engage the housing aperture 112. In other words, if the adjustment is not in perfect alignment but only slightly off, the tapered lower portion of the locking pin 86 will partially enter the housing aperture 112, so that only the slightest movement is necessary to cause the control knob to assume a locked position in the desired angular alignment. On the other hand, if the adjusted position is more remote, then the locking pin 86 will come to rest on the flat upper surface of the gear housing cover 40 in an unlocked position. Since the locking pin 86 is biased by the leaf spring 96 against the housing 40, the operator need only slowly turn on the control knob 60 to cause the locking pin 86 to move along the hypothetical circular line, and thus enter the desired aperture 112.

The control knob 60 will control the position of the saw bar 32 and connected saw blade 52 and may be provided with a fixed index mark as at 114 of the pointer 78, as shown in FIG. 3.

In the present construction, the slabbed end 72 of the saw bar 32 is journaled in the journal bushing 42 which is directly connected to the control knob 60. This provides a close coupled rigid control of the saw bar 32 by the control knob 60 and results in highly accurate control of the saw blade 52 in following a desired pattern contour.

FIG. 9 illustrates a sabre saw embodying the present invention being used as a scroll saw to cut a circular disc from a work piece. If a conventional sabre saw, one not having the swivelling saw bar feature of the present invention, is used to follow a curve pattern of this kind, it is necessary to orientate the entire tool to follow the curve. This involves the controlled guiding and turning of considerable mass from a position offset from the cutting axis of the tool which becomes increasingly difficult as the radius approacher becomes small relative to the tool dimensions. However, by use of the control knob 60 of the illustrated embodiment of the present invention, it is possible to guide the saw bar from a position directly above the cutting axis of the tool by rotating the control knob 60 which requires only the turning of the small mass of the saw bar itself, thus enabling the accurate cutting of intricate patterns more readily. With the full 360° swivelling of the saw bar independent of the rest of the tool body, it is only necessary to rotate the control knob 60 to guide the cutting edge 54 as desired and let the body of the tool assume any angle that it may take.

It will be understood that various changes in the details, materials, arrangements of parts and operating conditions, which have been herein described and illustrated in order to explain the nature of the invention, may be made by those skilled in the art within the principles and scope of the invention.

Having thus set forth the nature of the invention, what I claim herein is:

1. In a power operated portable saw having a housing and a saw bar including driving means for reciprocating the saw bar along a linear axis while permitting the saw bar to freely be rotated about said axis, means controlling the rotation of said saw bar comprising:
   a. a journal bushing rotatively connected to the housing and projecting outwardly thereof,
   b. the journal bushing having a longitudinal opening of noncircular shape,
   c. the saw bar having a top portion shaped corresponding to and mating within the longitudinal opening of the journal bushing, whereby the saw bar is free to reciprocate therein but prevented from separate rotation,
   d. a control knob affixed to the journal bushing at the outward projection thereof,
   e. at least one aperture in the housing formed parallel to and radially outwardly from the axis of the saw bar,
   f. a locking pin carried in the control knob and spring-biased in the direction of the housing,
   g. the locking pin having the same radial distance from the axis of the saw bar as the said one aperture,
   h. a control means including a control bar operatively connected to a control arm carried on the locking pin, which control arm is biased against a cam having a vertically tapered surface, i. the control means having a locked position in which the locking pin is biased into the said aperture of the housing and an unlocked position in which the movement of the control bar urges the control arm to rise upon the cam and force the locking pin upwardly out of engagement with the said aperture of the housing, thus freeing the control knob and connected journal bushing and saw bar to rotate.

2. The combination claimed in claim 1 wherein:

a. the locking pin is continuously spring-biased in the direction of the housing with the control means in the locked position and the unlocked position.

3. The combination claimed in claim 1 wherein:

a. a plurality of the said apertures of the housing formed at predetermined angles about the journal bushing.

4. The combination claimed in claim 3 wherein:

a. each of the plurality of said apertures having an equal radial distance from the axis of the saw bar.

* * * * *